United States Patent
Daly et al.

(10) Patent No.: US 12,387,424 B2
(45) Date of Patent: Aug. 12, 2025

(54) GENERATING AND MODIFYING AN ARTIFICIAL REALITY ENVIRONMENT USING OCCLUSION SURFACES AT PREDETERMINED DISTANCES

(71) Applicant: Meta Platforms Technologies, LLC, Menlo Park, CA (US)

(72) Inventors: Gregory Mayo Daly, Seattle, WA (US); Nicholas McGee, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 87 days.

(21) Appl. No.: 18/157,003

(22) Filed: Jan. 19, 2023

(65) Prior Publication Data
US 2023/0162436 A1 May 25, 2023

Related U.S. Application Data

(63) Continuation of application No. 17/356,427, filed on Jun. 23, 2021, now Pat. No. 11,562,529.

(51) Int. Cl.
*G06T 15/00* (2011.01)
*G06T 7/50* (2017.01)
(Continued)

(52) U.S. Cl.
CPC ............ *G06T 15/205* (2013.01); *G06T 7/50* (2017.01); *G06T 19/006* (2013.01); *G06F 3/012* (2013.01); *G06F 3/013* (2013.01); *G06T 2210/64* (2013.01)

(58) Field of Classification Search
CPC ....... G06T 15/205; G06T 7/50; G06T 19/006; G06T 7/11; G06T 2207/10021;
(Continued)

(56) References Cited

U.S. PATENT DOCUMENTS

| | | | |
|---|---|---|---|
| 11,562,529 B2 | 1/2023 | Daly et al. | |
| 2012/0200667 A1* | 8/2012 | Gay | H04N 5/272 348/43 |

(Continued)

OTHER PUBLICATIONS

Lecocq P., et al., "Sub-Pixel Shadow Mapping," In Proceedings of the 18th meeting of the ACM SIGGRAPH Symposium on Interactive 3D Graphics and Games, Mar. 2014, pp. 103-110.

*Primary Examiner* — Sarah Lhymn
(74) *Attorney, Agent, or Firm* — Greenberg Traurig, LLP

(57) ABSTRACT

A method includes generating a depth map of a real environment as seen from a viewpoint that comprises pixels having corresponding depth values of one or more physical objects. A first two-dimensional occlusion surface is generated representing at least a visible portion of the one or more physical objects located within a first predetermined depth range defined relative to the viewpoint. A second two-dimensional occlusion surface is generated such that a minimum depth of a second predetermined depth range is greater than a maximum depth of the first predetermined depth range. The first and second occlusion surfaces are posed in a three-dimensional coordinate system. The visibility of a virtual object is determined relative to the one or more physical objects by comparing a model of the virtual object with the first and second occlusion surfaces, and an output image is generated based on the visibility of the virtual object.

20 Claims, 11 Drawing Sheets

(51) Int. Cl.
*G06T 15/20* (2011.01)
*G06T 19/00* (2011.01)
*G06F 3/01* (2006.01)

(58) Field of Classification Search
CPC . G06T 2207/10028; G06T 2207/30244; G06T 15/40; G06T 19/20; G06F 3/012; G06F 3/016; G06V 20/20
See application file for complete search history.

(56) References Cited

U.S. PATENT DOCUMENTS

| | | | |
|---|---|---|---|
| 2013/0063556 A1* | 3/2013 | Russell | G06T 7/194 |
| | | | 348/E13.001 |
| 2014/0098096 A1 | 4/2014 | Bavoil | |
| 2019/0197765 A1 | 6/2019 | Molyneaux et al. | |
| 2019/0385323 A1* | 12/2019 | Doyen | G06T 7/557 |
| 2021/0004630 A1 | 1/2021 | Uscinski | |
| 2021/0125307 A1* | 4/2021 | Ranade | H04N 23/951 |
| 2021/0383616 A1* | 12/2021 | Rong | G06N 3/08 |
| 2022/0129066 A1 | 4/2022 | Zahnert et al. | |

* cited by examiner

GENERATING AND MODIFYING AN ARTIFICIAL REALITY ENVIRONMENT USING OCCLUSION SURFACES AT PREDETERMINED DISTANCES

PRIORITY

This application is a continuation under 35 U.S.C. § 120 of U.S. patent application Ser. No. 17/356,427, filed 23 Jun. 2021, which is incorporated herein by reference.

TECHNICAL FIELD

This disclosure generally relates to augmented-reality, virtual-reality, mixed-reality, or hybrid-reality environments.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD 104) connected to a host computer system, a standalone HMD 104, a mobile device or computing system, or any other hardware platform capable of providing artificial reality content to one or more viewers.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Disclosed methods provide techniques for occluding two-dimensional and three-dimensional virtual objects in AR/VR/MR environments by generating and posing one or more two-dimensional occlusion surfaces that may represent one or more physical objects in the real environment. In particular embodiments, a particular two-dimensional occlusion surface may be used to represent one or more physical objects that are located at a distance or depth range from a viewpoint of a user of an artificial reality system. At a high-level, a computing system may generate a depth map of a real environment as seen from a viewpoint of a user, the depth map comprising pixels having corresponding depth values of one or more physical objects in the real environment. Based on the depth map, the computing system may generate a two-dimensional occlusion surface representing at least a visible portion of the one or more physical objects that are located within a predetermined depth range defined relative to the viewpoint. Particular disclosed methods may further pose the two-dimensional occlusion surface in a three-dimensional coordinate system such that the two-dimensional occlusion surface is located at a predetermined distance from the viewpoint. The pose may be further based on a subsequent pose of an HMD worn by the user of the artificial reality system. The computing system may determine a visibility of a virtual object relative to the one or more physical objects by comparing a model of the virtual object with the two-dimensional occlusion surface and generate an output image based on the determined visibility of the virtual object. In doing so, the computing system may accurately predict and generate a view of an immersive artificial reality environment to the user of the HMD.

In particular embodiments, the generated view may be rendered by one or more components (e.g., CPU, GPU, etc.) of a computing system associated with a device (e.g., a laptop, a cellphone, a desktop, a wearable device). In particular embodiments, the device is in communication with a computing system on the HMD but may be otherwise physically separated from the HMD. As an example and not by way of limitation, this device may be a laptop device that is wired to the HMD or communicates wirelessly with the HMD. As another example and not by way of limitation, the device may be a wearable (e.g., a device strapped to a wrist), handheld device (e.g., a phone), or some other suitable device (e.g., a laptop, a tablet, a desktop) that is wired to the HMD or communicates wirelessly with the HMD. In particular embodiments the device may send this initial view to the HMD for display. In particular embodiments the components of the device that generated the initial view may also generate the one or more surfaces representing the object of interest for the view. As another example and not by way of limitation, an onboard computing system of an HMD may resample and adjust the pose of the one or more surfaces after it receives the initial view from a separate computing system (e.g., from a CPU or GPU of a wearable, handheld, or laptop device) to account for movements of the HMD and/or object of interest that may occur while rendering the initial image.

In particular embodiments, graphics applications (e.g., games, maps, content-providing apps, etc.) may build a scene graph, which is used together with a given view position and point in time to generate primitives to render on a GPU. The scene graph may define the logical and/or spatial relationship between objects in the scene. In particular embodiments, a display engine may also generate and store a scene graph that is a simplified form of the full application scene graph. The simplified scene graph may be used to specify the logical and/or spatial relationships between surfaces (e.g., the primitives rendered by display engine, such as quadrilaterals or contours, defined in 3D space, that have corresponding textures generated based on the main-frame rendered by the application). Storing a scene graph allows the display engine to render the scene to multiple display frames, adjusting each element in the scene graph for the current viewpoint (e.g., head position), the current object positions (e.g., they could be moving relative to each other) and other factors that change per display frame. In addition, based on the scene graph, display engine may also adjust for the geometric and color distortion introduced by the display subsystem and then composite the objects together to generate a frame. Storing a scene graph allows the display engine to approximate the result of rendering at the display rate, while actually rendering the asset at a significantly lower rate.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
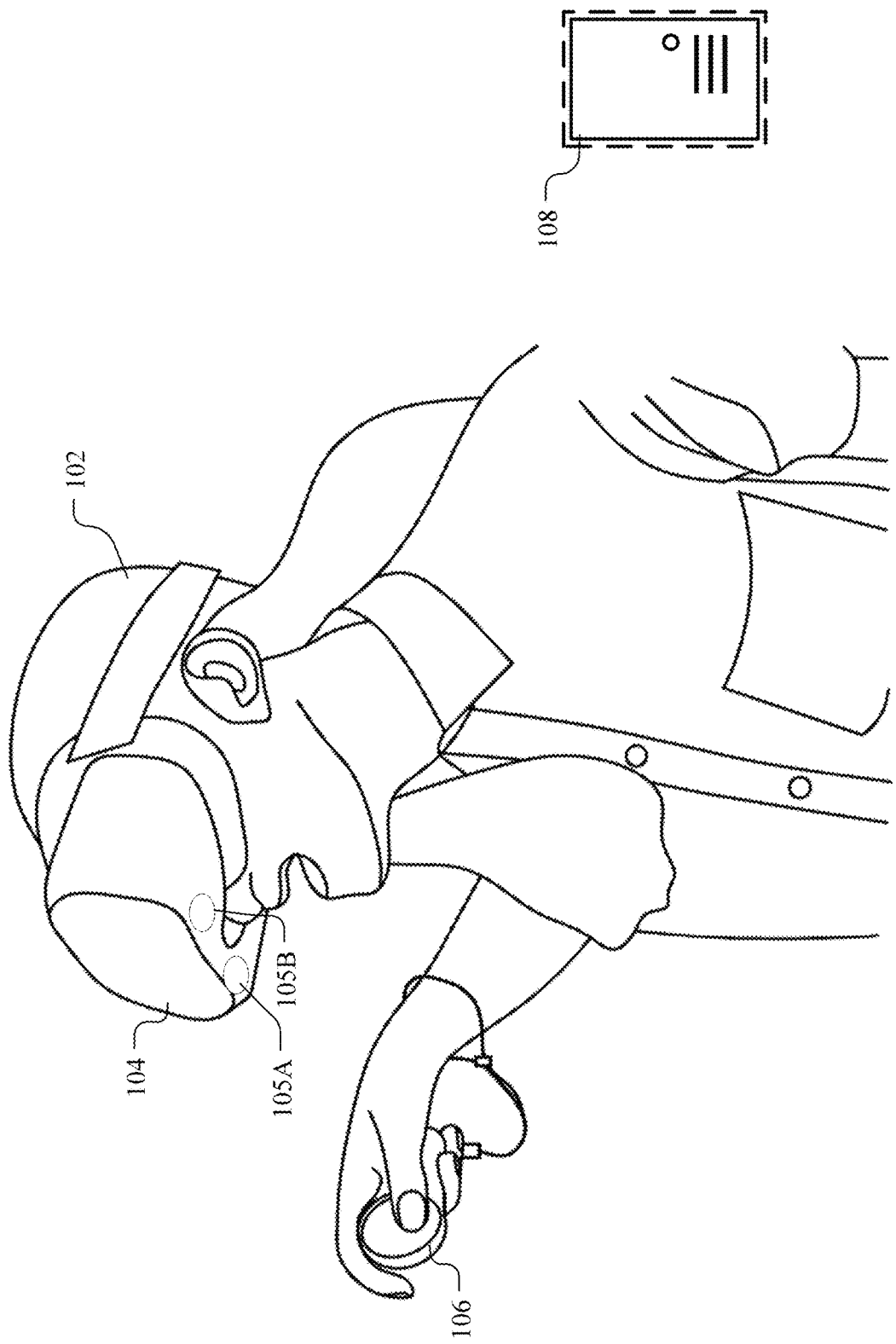
FIG. 1A illustrates an example artificial reality system and user.

FIG. 1A illustrates an example artificial reality system 100 and user 102. In particular embodiments, the artificial reality system 100 may comprise a headset 104, a controller 106, and a computing system 108. A user 102 may wear the headset 104 that may display visual artificial reality content to the user 102. The HMD 104 may include an audio device that may provide audio artificial reality content to the user 102. The headset 104 may include an eye tracking system to determine a vergence distance of the user 102. A vergence distance may be a distance from the user's eyes to objects (e.g., real-world objects or virtual objects in a virtual space) upon which the user's eyes are converged. The headset 104 may be referred to as a head-mounted display (HMD). One or more controllers 106 may be paired with the artificial reality system 100. In particular embodiments, one or more controllers 106 may be equipped with at least one inertial measurement units (IMUs) and infrared (IR) light emitting diodes (LEDs) for the artificial reality system 100 to estimate a pose of the controller and/or to track a location of the controller, such that the user 102 may perform certain functions via the controller 106. In particular embodiments the one or more controllers 106 may be equipped with one or more trackable markers distributed to be tracked by the computing system 108. The one or more controllers 106 may comprise a trackpad and one or more buttons. The one or more controllers 106 may receive inputs from the user 102 and relay the inputs to the computing system 108. The one or more controllers 106 may also provide haptic feedback to the user 102. The computing system 108 may be connected to the headset 104 and the one or more controllers 106 through cables or wireless connections. The one or more controllers 106 may include a combination of hardware, software, and/or firmware not explicitly shown herein so as not to obscure other aspects of the disclosure.

The artificial reality system 100 may further include a computer unit 108. The computer unit may be a stand-alone unit that is physically separate from the HMD or it may be integrated with the HMD. In embodiments where the computer 108 is a separate unit, it may be communicatively coupled to the HMD via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Figure 1B:
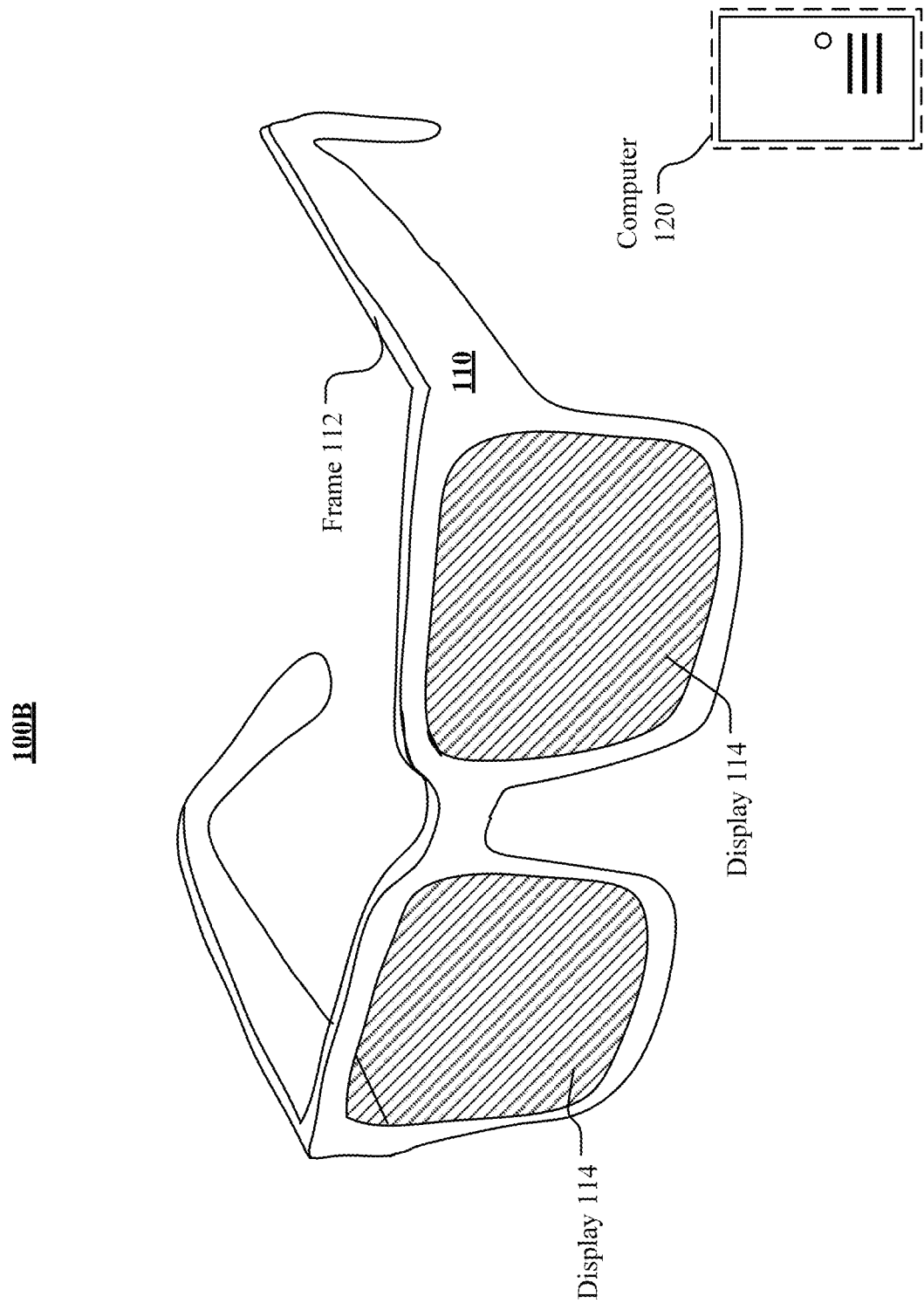
FIG. 1B illustrates an example augmented reality system.

FIG. 1B illustrates an example augmented reality system 100B. The augmented reality system 100B may include an augmented reality head-mounted display (AR HMD) 110 (e.g., glasses) comprising a frame 112, one or more displays 114, and a computing system 120. The displays 114 may be transparent or translucent allowing a user wearing the AR HMD 110 to look through the displays 114 to see the real world and displaying visual artificial reality content to the user at the same time. The AR HMD 110 may include an audio device that may provide audio artificial reality content to users. The AR HMD 110 may include one or more cameras which can capture images and videos of environments. The AR HMD 110 may include an eye tracking system to track the vergence movement of the user wearing the AR HMD 110. Except as where specified throughout this application, the use of "HMD" can be used to refer to either HMD 104 (which may occlude the user's view of the real environment) or AR HMD 110 (which may permit the user to see the real world and displaying visual artificial reality content to the user at the same time).

The augmented reality system 100B may further include a controller comprising a trackpad and one or more buttons. The controller may receive inputs from users and relay the inputs to the computing system 120. The controller may also provide haptic feedback to users. The computing system 120 may be connected to the AR HMD 110 and the controller through cables or wireless connections. The computing system 120 may control the AR HMD 110 and the controller to provide the augmented reality content to and receive inputs from users. The computing system 120 may be a standalone host computer system, an on-board computer system integrated with the AR HMD 110, a mobile device, or any other hardware platform capable of providing artificial reality content to and receiving inputs from users.

The HMD may have external-facing cameras, such as the two forward-facing cameras 105A and 105B shown in FIG. 1A. While only two forward-facing cameras 105A-B are shown, the HMD may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras 105A and 105B are configured to capture the physical environment around the user and may do so continuously to generate a sequence of frames (e.g., as a video).

In particular embodiments, the pose (e.g., position and orientation) of the HMD within the environment may be needed. For example, in order to render an appropriate display for the user 102 while he is moving about in a virtual or augmented reality environment, the system 100 would need to determine his position and orientation at any moment. Based on the pose of the HMD, the system 100 may further determine the viewpoint of either of the cameras 105A and 105B or either of the user's eyes. In particular embodiments, the HMD may be equipped with inertial-measurement units ("IMU"). The data generated by the IMU, along with the stereo imagery captured by the external-facing cameras 105A-B, allow the system 100 to compute the pose of the HMD using, for example, SLAM (simultaneous localization and mapping) or other suitable techniques.

Since its existence, artificial reality (e.g., Augmented Reality (AR), Virtual Reality (VR), Mixed Reality (MR)) technology has been plagued with the problem of latency in rendering AR/VR/MR representations of virtual objects in response to sudden changes in a user's perspective. Traditional three-dimensional artificial reality environment reconstruction techniques and algorithms may integrate depth information about the real environment gradually over time to create a 3D mesh of the world, which can be used to re-render the environment as the user perspective changes. However, these methods are inherently too slow to account for constant changes in perspective as the user experiences an artificial reality environment. For example, users may suddenly move their heads around when viewing a scene and the rendered image may need to respond immediately to the changed perspective by adjusting the view of one or more virtual representations presented to the user. With traditional approaches, re-rendering a view in its entirety to account for changes in perspective may only be possible to do at a relatively low frame rate (e.g., 60 Hz, or once every ⅟₆₀th of a second). As a result, it may not be feasible to modify the view by re-rendering the entire view to account for changes in perspective at a pace that is rapid enough (e.g., 200 Hz, once every ⅟₂₀₀th of a second) to prevent the user from perceiving latency and to thereby avoid or sufficiently reduce sensory dissonance.

Moreover, traditional artificial reality environment reconstruction techniques and algorithms may require expensive computing resources that limit the ability to recreate the artificial reality environment using components that are compact enough to be housed within an HMD, especially an AR HMD with a small form factor. Yet, the time scales involved are often so small that it may be unfeasible to have a more powerful system that is physically separated from the HMD (e.g., a separate laptop or wearable device) perform the modification, because the HMD would have to transmit the captured image as well as information about the current position and orientation of the HMD, wait for the separate system to detect real (e.g., physical) objects in the image and render the new view, and then receive the new view from the separate system.

One solution to these traditional rendering methods involves generating and resampling "surfaces." A surface may be one or more primitives rendered by a display engine, such as quadrilaterals or contours, defined in 3D space, that have corresponding textures generated based on the mainframe rendered by the application. In particular embodiments one or more surfaces may represent a particular view of objects (e.g., real or virtual objects) within the artificial reality environment, where a surface corresponds to one or more objects that are expected to move/translate, skew, scale, distort, or otherwise change in appearance together, as one unit, as a result of a change in perspective. This method may essentially be an efficient shortcut for adjusting a view in response to head movements of the user, and may significantly reduce the processing that is required and thus ensure that the view is updated quickly enough to sufficiently reduce latency. Methods for generating and modifying representations of objects in an augmented-reality or virtual reality environment are disclosed in U.S. patent application Ser. No. 16/586,590, filed 27 Sep. 2019, which is incorporated by reference. In particular embodiments, resampling surfaces in response to sudden movements, unlike re-rendering entire views, may be efficient enough that it can be used to modify views within the allotted time with the relatively limited processing power of a computing system of a HMD, especially an AR HMD that may be designed with a small form-factor to closely resemble a conventional pair of eyeglasses. By simply resampling surfaces, the modification may be performed entirely on the HMD, thus speeding up the process.

The disclosed invention permits a two-stage system to replace traditional occlusion techniques by rendering 2D surfaces at varying depths in the AR scene, with each surface representing an occlusion surface of one or more physical objects in the real environment located within a certain depth range from the user (e.g., all physical objects within 0-1 meters of a viewpoint or pose of the user are used to generate a first 2D occlusion surface, all objects between 1-2 meters of a viewpoint or pose of the user are used to generate a second 2D occlusion surface, etc.). This technique provides occlusion rendering to scale to any number of physical objects in the scene, rather than generating a separate occlusion surface for each individual object. This greatly reduces computational resources and lag. Further, by combining several physical objects into a single occlusion mask based on depth, there is less need for re-rendering as the computing system can reuse the mask surfaces as the user moves around the environment (e.g., the user's perspective changes less for occlusion masks located at greater distances from the user). This may be especially true for objects located at greater distances from a viewpoint or pose of the user, as slight movements by the user may result in indiscernible changes in perspective for physical objects at greater distances from the viewpoint or pose of the user.

Particular embodiments disclosed herein utilize one or more surfaces of the invention may include or be implemented in conjunction with an artificial reality system. In particular embodiments, the processing tasks involved in rendering an artificial reality environment and generating and modifying its surfaces may be split among two or more computing systems. As an example and not by way of limitation, a depth map of a real environment as seen from a viewpoint of a user may initially be generated by a first computing system (e.g., a laptop, a cellphone, a desktop, a wearable device). The rendered results may be used to generate one or more surfaces for the view and/or one or more surfaces representing at least a visible portion of the one or more physical objects in the real environment that are located within a predetermined depth range defined relative to the viewpoint. In addition to texture, color, and transparency information, the surfaces may include information about their location in the artificial reality environment. These surfaces may be passed to a second computing system (e.g., an onboard computing system on an HMD). The HMD may pose (e.g., position and orientation) the surfaces in a three-dimensional coordinate system such that the two-dimensional occlusion surface is located at a predetermined distance from the viewpoint or pose of the user. Posing these occlusion surfaces may be further based on a current viewpoint or pose of the user wearing the HMD (e.g., as determined by the position and orientation of the HMD), such that for example and not by way of limitation, a surface normal of the surface points at the viewpoint or pose of the user. Any changes in the user's perspective may be tracked by received image data and sensors on the HMD and accounted for by resampling the surfaces in a view to render a time-adjusted viewpoint. Due to the adjustment of the viewpoint, the surfaces may be translated/moved, skewed, scaled, distorted, or otherwise changed in appearance when they are resampled. Since the viewpoint is not being re-rendered from scratch, the viewpoint can be modified relatively quickly (e.g., at 200 Hz). In particular embodiments, the first computing system may be relatively powerful when compared to the second computing system, because the second computing system (e.g., a HMD) may have limited system resources that may not appreciably be increased without resulting in too much weight, size, and/or heat for the user's comfort. The computing system may use the posed surfaces to determine a visibility of a virtual object relative to the one or more physical objects by comparing a model or surface representing the virtual object with the two-dimensional occlusion surfaces and generating an output image based on the determined visibility of the virtual object. In addition to the resources and time conserved by this approach, an additional advantage provided by the disclosed embodiments is the ability for the artificial reality system to render its assets without any intrinsic knowledge of the user's environment. Thus, a user can still experience an immersive artificial reality experience without sharing details of their personal spaces (e.g., their home) with a third-party application. The disclosed embodiments thus improve security and privacy simply by reducing the amount of personal information the user must provide to enable the third-party application, thereby reducing the risk of third-party applications revealing the user data.

Figure 2A:
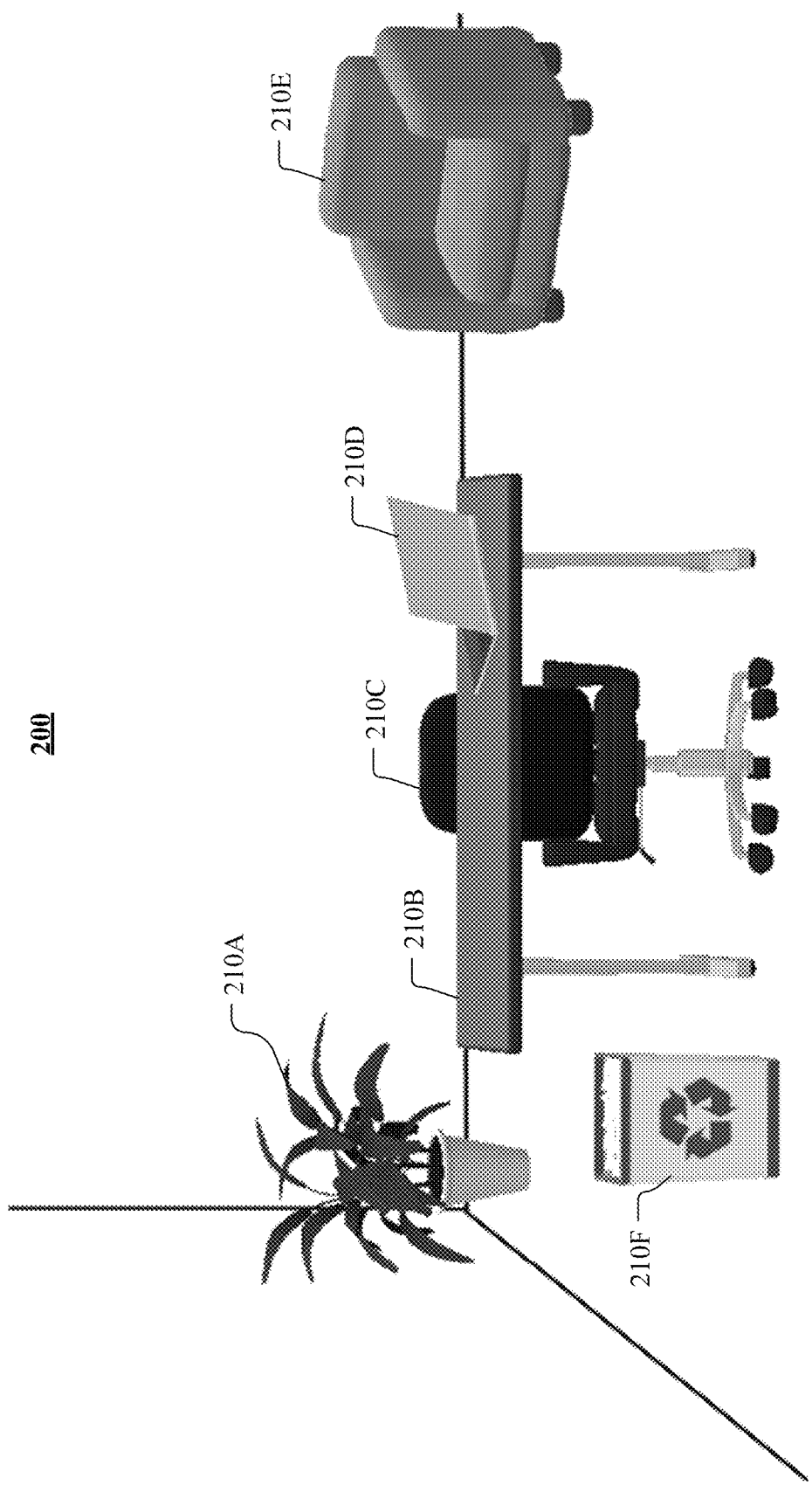
FIG. 2A illustrates a real environment containing one or more physical objects as seen from the viewpoint of a user of an artificial reality system.
Figure 2B:
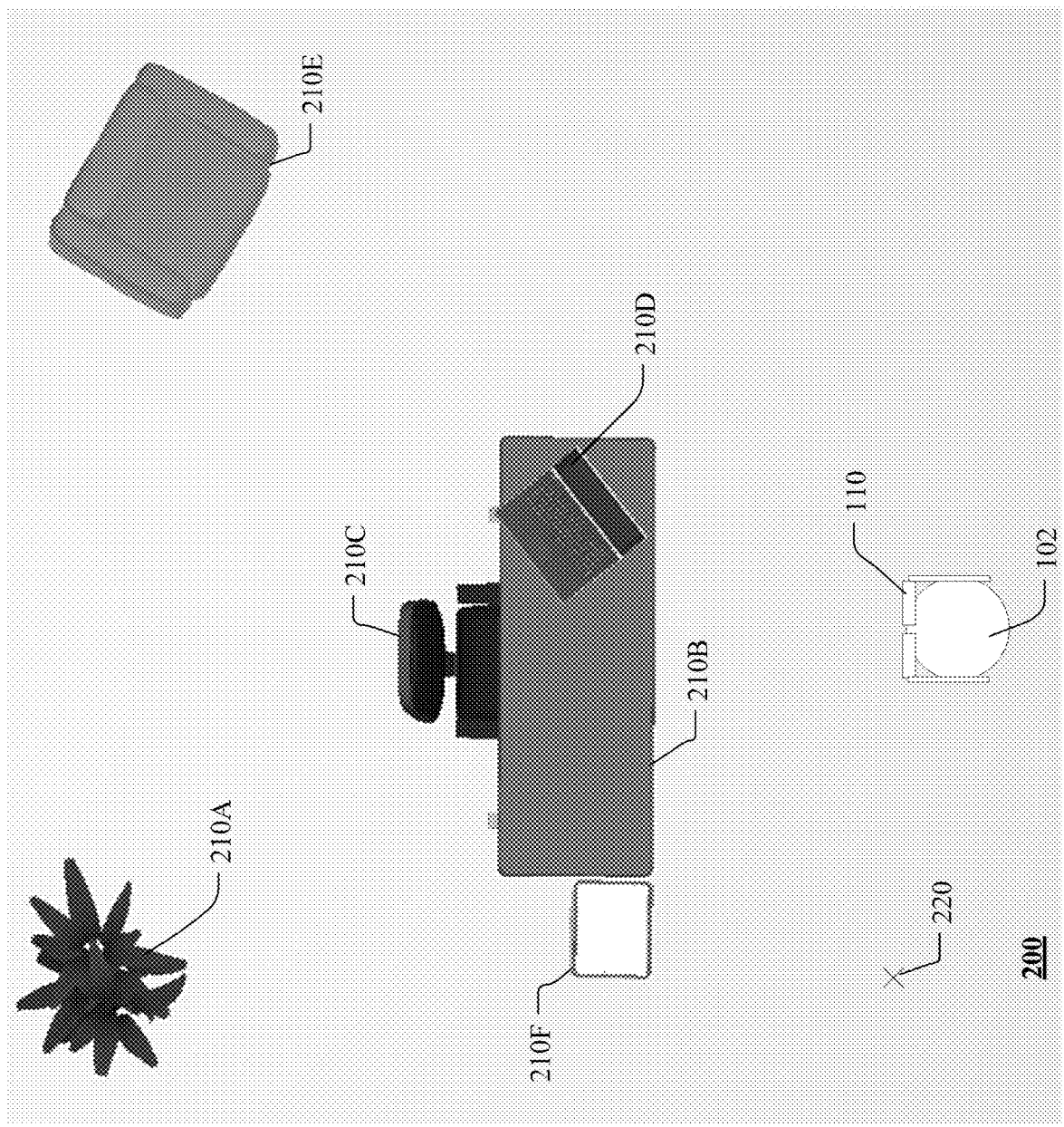
FIG. 2B illustrates a real environment containing one or more physical objects observed from an overhead perspective (e.g., an aerial perspective).

FIG. 2A illustrates a real environment containing one or more physical objects as seen from the viewpoint of a user of an artificial reality system. In particular embodiments, real environment 200 may include one or more physical objects posed in the real environment, for example and not by way of limitation plant 210A, desk 210B, chair 210C, laptop 210D, chair 210E, and recycle bin 210F. In particular embodiments the physical objects may be positioned at various depths from the viewpoint or pose of the user of the artificial reality system. FIG. 2B illustrates a real environment containing one or more physical objects observed from an overhead perspective (e.g., an aerial perspective). As illustrated in FIG. 2B, desk 210B, chair 210C, laptop 210D, and recycle bin 210F in real environment 200 may be located at a shallower depth to user 102. As another example, plant 210A and chair 210E may be located a greater depth to user 102.

In particular embodiments the computing system may generate a depth map or point cloud of the real environment. The depth map or point cloud may comprise a plurality of pixels, each pixel corresponding to a position or coordinate in the real environment. In particular embodiments one or more of the pixels may have corresponding distance or depth values, which may represent the distance of one or more physical objects in the real environment to a particular coordinate (e.g., a signed distance field). In particular embodiments, the distance or depth values may represent a distance from a particular coordinate to a particular physical object, or a particular portion of a physical object. For example, returning to FIG. 2B, the distance from coordinate 220 to recycle bin 210F may be measured to one or more particular coordinates, corners, edges, surfaces, centroids, or an average depth of plurality of points of recycle bin 210F.

In particular embodiments, the computing system may receive one or more depth measurements of the real environment. In particular embodiments, the one or more depth measurements may be determined based on sensor or image data (e.g., images captured by one or more cameras worn by the user that is connected to a head-mounted display, LIDAR, pre-generated stored depth maps of a real environment, etc.). In particular embodiments the depth measurements may be sparse depth measurements. In particular embodiments the computing system may generate a depth map of the real environment based on one or more depth measurements. Although this disclosure describes certain techniques for generating a depth map or point cloud of a real-environment, it should be appreciated that any suitable techniques for determining depth measurements utilizing image data or sensor data from an artificial reality system can be utilized.

In particular embodiments, the computing system may continuously update the depth map as the user moves throughout the real environment. For example, the computing system may continuously receive image data or sensor data that indicates that the current depth map is inaccurate or outdated, due to for example the relocation of one or more physical objects in the real environment since the depth map was generated or last updated. In particular embodiments, the computing system may generate a 3D mesh of the environment based on the depth map or point cloud.

Figure 3:
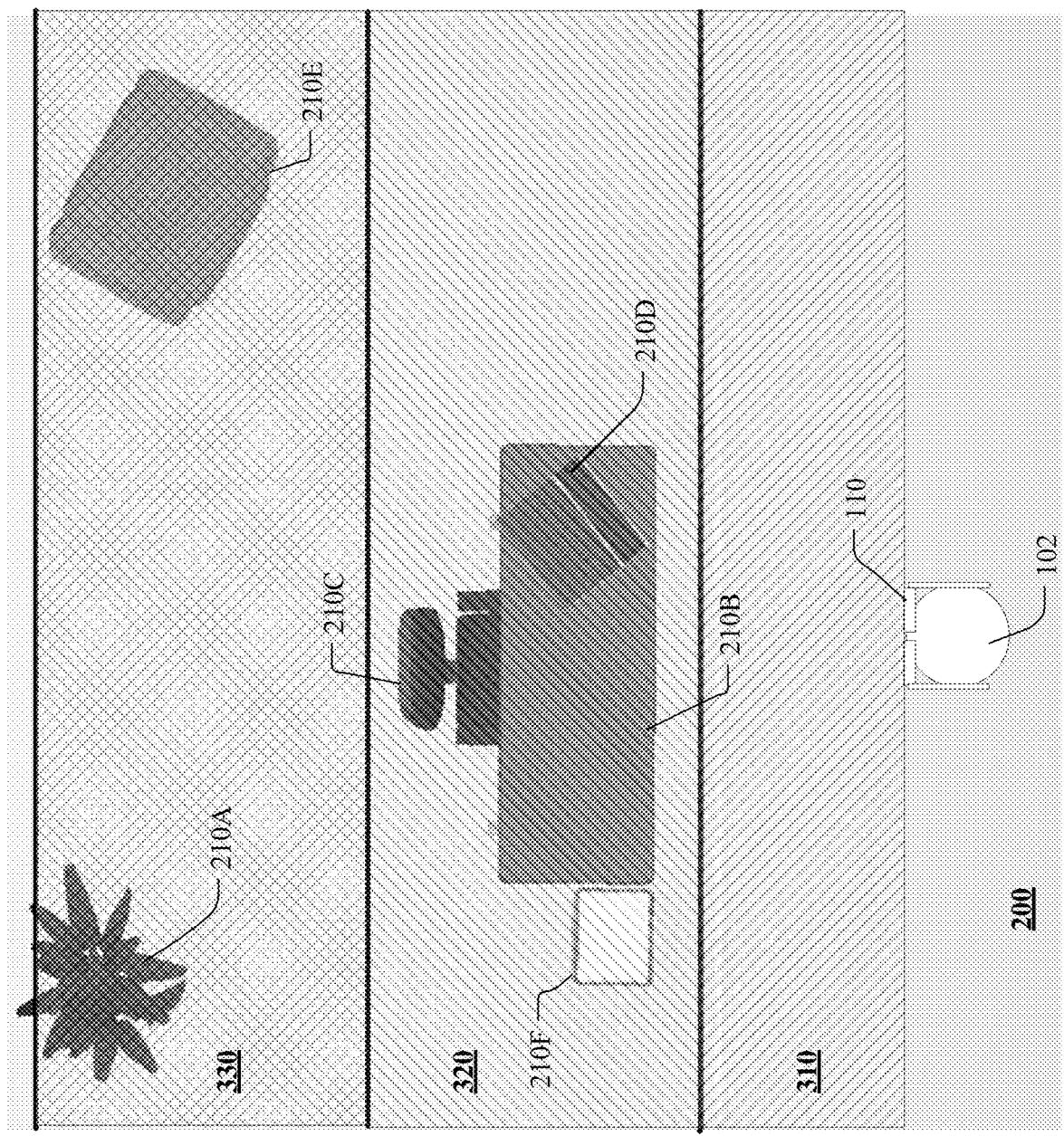
FIG. 3 illustrates a real environment from an overhead perspective that has been divided into one or more depth regions.

In particular embodiments, the computing system may generate one or more depth regions that divide the real environment. FIG. 3 illustrates a real environment from an overhead perspective that has been divided into one or more depth regions. In particular embodiments depth regions may represent a range of distances from a particular coordinate in the real environment, for example a coordinate representing a particular viewpoint or pose of a user or HMD. As illustrated in FIG. 3, depth regions may represent an area or volume of the real environment that is located at a particular range of distances from the viewpoint or pose of user 102. For example, depth region 310 may represent a region of the real environment that is located between 0 and 1 meters from the viewpoint of user 102, depth region 320 may represent a region of the real environment that is located between 1 and 3 meters from the viewpoint of user 102, and depth region 330 may represent a region of the real environment that is located between 3 and 5 meters from the viewpoint of user 102. Although FIG. 3 illustrates depth regions with varying widths, it should be appreciated that in certain non-limiting embodiments the size of each depth region may be constant (e.g., each depth region is a constant width of 1 meter), or the size of each depth region may vary based on any number of factors, for example the size of the real environment 200, the application the user of the artificial reality system is interacting with, or the current speed, acceleration, etc. of the user 102. It should also be appreciated that in certain non-limiting embodiments the number of depth regions that divide the real environment may vary based on any number of factors, for example the size of the real environment 200 (e.g., a larger environment may require more depth regions), the application the user of the artificial reality system is interacting with (e.g., a gaming application may require more depth regions than a video conferencing application), or the current speed, acceleration, etc. of the user 102 (e.g., a user moving at a faster pace may require more depth regions to avoid latency as the user moves throughout the real environment). It should further be appreciated that although FIG. 3 illustrates a depth region as having a particular shape or volume (e.g., a rectangle or rectangular prism), in particular embodiments one or more depth regions may be represented by any suitable shape, including for example circles, semi-circles, arcs, cones, squares, trapezoids, etc. In particular embodiments the depth regions may be centered around a particular coordinate that represents a viewpoint or pose of the user (e.g., concentric circles radiating outward from the pose or viewpoint of the user).

In particular embodiments the computing system may use the depth map or the image data to determine a distance of one or more physical objects or pixels from the viewpoint or pose of the user in the real environment. The computing system may determine a pose or viewpoint of the user in the real environment, using for example the current pose of the HMD, the viewpoint of one or more cameras on the HMD, or a viewpoint of one or more of the user's eyes. Based on the current pose or viewpoint of the user in the real environment, the computing system may determine a distance of one or more physical objects or pixels from the viewpoint or pose of the user. In particular embodiments the distance from user 102 to a particular physical object may be measured from a particular coordinate, corner, edge, surface, centroid, or average depth of plurality of points of a real object to a particular coordinate corner, edge, surface, centroid, or average depth of plurality of points representing user 102 (e.g. a coordinate representing the pose or viewpoint of a user's eye) using the methods described herein.

In particular embodiments the computing system may assign one or more pixels in the depth map to one or more of the predefined depth regions. For example, the computing system may assign all pixels that are 0-1 meters from the viewpoint or pose of the user to depth region 310, all pixels that within 1-2 meters from the viewpoint or pose of the user to depth region 320, etc. This may result in objects being separated across two or more depth regions (e.g., an object that crosses the boundary between depth region 310 and depth region 320). As a result, in some embodiments a particular physical object may be represented by two or more two-dimensional occlusion masks (e.g., the occlusion mask for region 310 may represent the portion of the physical object between 0-1 meters from, whereas the occlusion mask for region 320 may represent a different portion of the same physical object that is between 1 and 2 meters from the viewpoint or pose of the user). Such an approach may be computationally efficient, but may create visual artifacts or other inaccuracies.

In particular embodiments the computing system may assign one or more physical objects to one or more of the predefined depth regions. Using the depth map and corresponding image data, the computing system may determine and group one or more pixels in the image that correspond to a particular object using known image segmentation techniques (e.g., using a neural network to generate a segmentation mask, etc.). For example, all pixels corresponding to desk 210B may form a single segmentation mask. Returning to FIG. 3, the computing system may determine that desk 210B, chair 210C, laptop 210D, and recycle bin 210F are located within depth region 320, whereas plant 210A and chair 210E are located within depth region 330.

Although not depicted in FIG. 3, in particular embodiments a physical object may intersect a depth region boundary such that a portion of the physical object is located within two or more depth regions. In this event, the computing system may assign that particular physical object to a single depth region using the depth map and segmentation mask. For example, although different pixels representing desk 210B may have multiple depth measurements as previously described, the computing system may receive all depth measurements for each of the pixels that correspond to a particular physical object and select a particular value (e.g., a mean, median, maximum, minimum, etc. depth value) of all depth values received for a particular physical object. In some embodiments the computing system may further remove one or more outliers from the received depth measurements prior to selecting a particular value, In particular embodiments, selecting the minimum depth value of a particular physical object (resulting in the physical object being placed into the nearest depth region of the multiple depth regions the physical object may encroach) may result in a more immersive and realistic artificial reality environment for the user.

Figure 4A:
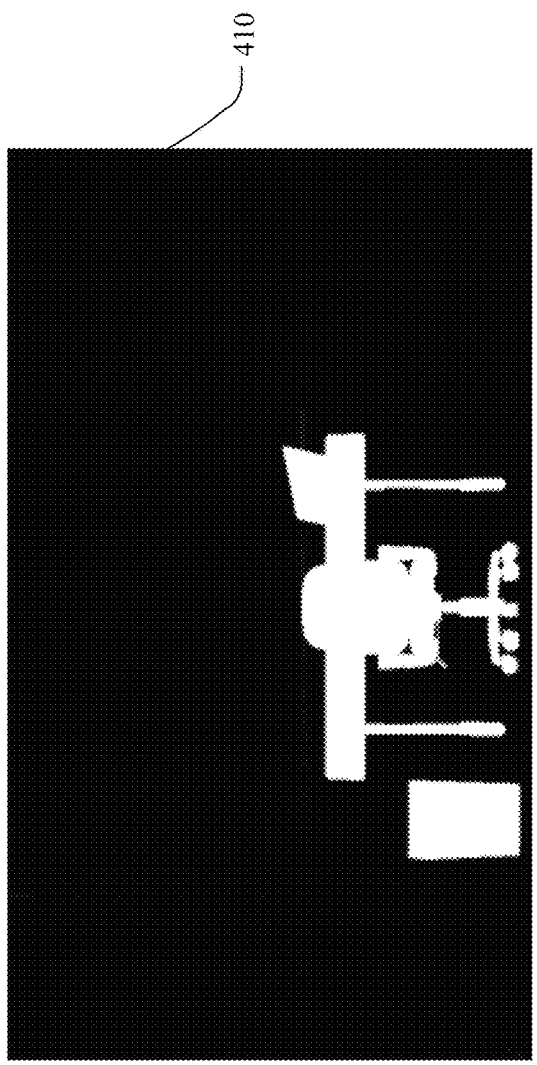
FIGS. 4A and 4B illustrate two-dimensional occlusion surfaces that represent at least a visible portion of one or more physical objects located within a predetermined depth region.
Figure 4B:
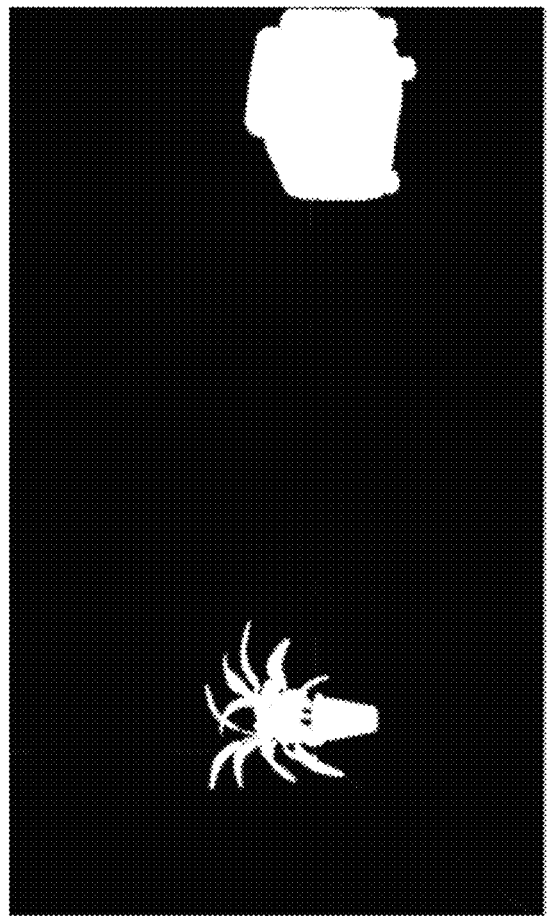

FIGS. 4A and 4B illustrate two-dimensional occlusion surfaces that represent at least a visible portion of one or more physical objects located within a predetermined depth region. In particular embodiments the computing system may use the depth map to generate one or more two-dimensional occlusion surfaces that represent at least a visible portion of the one or more physical objects located within a predetermined depth region that are to be displayed within a view of an artificial reality environment. For example, FIG. 4A may illustrate a two-dimensional occlusion surface 410 for depth region 320, which includes at least a portion of one or more physical objects located within depth region 320, for example desk 210B, chair 210C, laptop 210D, and recycle bin 210F. FIG. 4B may illustrate a two-dimensional occlusion surface 420 for depth region 330, which includes at least a portion of one or more physical objects located within depth region 330, for example plant 210A and chair 210E. In particular embodiments a two-dimensional occlusion surface may be generated for each of the one or more depth regions representing the real environment.

In particular embodiments the two-dimensional occlusion mask may be generated to represent the user's viewing frustrum from the particular viewpoint or pose. The two-dimensional occlusion surfaces may represent the one or more physical objects as they should appear from a particular viewpoint, and as such, may account for the user's perspective of the object from the view at a particular time. A two-dimensional occlusion surface's texture data may be made up of one or more subparts, referred to herein as "texels." These texels may be blocks (e.g., rectangular blocks) that come together to create a texel array that makes up a two-dimensional occlusion surface. As an example and not by way of limitation, they may be contiguous blocks that make up a surface. For illustrative purposes, a texel of a surface may be conceptualized as being analogous to a pixel of an image. A two-dimensional occlusion surface may be generated by any suitable device. In particular embodiments, the surface may encode for visual information (RGBA) (e.g., as a texture) for one or more of its texels. The alpha component may be a value that specifies a level of transparency that is to be accorded to a texel. As an example and not by way of limitation, an alpha value of 0 may indicate that a texel is fully transparent, an alpha value of 1 may indicate that a texel is opaque, and alpha values in between may indicate a transparency level that is in between (the exact transparency level being determined by the value). A two-dimensional occlusion surface may support any suitable image format. To conserve resources, the two-dimensional occlusion surface may be transmitted as an alpha-mask that represents the occlusion and blending (e.g., transparency) of each pixel in the segmentation mask. The alpha-mask may be a low resolution texture (64×64 pixel), which reduces power consumption, provides for fuzzy (but aesthetically pleasing) borders when overlaid on an occluding object of interest 210, reduces latency due to smaller resolution, and provides for better scalability. In particular embodiments, the contour of the edge or border of each physical object represented in the two-dimensional occlusion mask could be defined using a signed-distance field. Applying a signed distance field may provide an aesthetic modification that results in a hard edge to each occlusion mask.

In particular embodiments, the two-dimensional occlusion surface may be posed in a three-dimensional coordinate system that corresponds to the real environment, for example known world-locked coordinates (x, y, z), based on the depth region that corresponds to a particular two-dimensional occlusion surface. The world-coordinates of the two-dimensional surface may be based on an absolute coordinate in the artificial reality environment (e.g., at a particular x, y, coordinate), or the world-coordinates of the surface may be determined relative to the pose of the user, the HMD, one or more other surfaces or virtual objects in the artificial reality environment (e.g., posed at a coordinate relative to a wall or virtual coffee table in the artificial reality environment). This allows for the two-dimensional occlusion surface to be located at a predetermined distance from the viewpoint, or pose of the user. For example, in particular embodiments a two-dimensional occlusion surface may be posed in the three-dimensional coordinate system at the maximum depth, minimum depth, or average depth of the particular depth region. For example, for two-dimensional occlusion surface 410 that corresponds to depth region 320 (e.g., between 1 meter and 3 meters from the user 102), two-dimensional occlusion surface 410 may posed at the maximum depth (e.g. 3 meters from user 102), the minimum depth (e.g., 1 meter from user 102), or at the average depth of the depth region (e.g., 2 meters from user 102). In some non-limiting embodiments, the computing system may pose the two-dimensional occlusion surface at any suitable depth within the particular depth region, for example and not by way of limitation at the depth of a particular physical object within the depth region (e.g., posing two-dimensional occlusion surface 410 at the particular depth of the edge of table 210B). In particular embodiments the computing system may pose a two-dimensional occlusion surface such that a surface normal of the particular two-dimensional occlusion surface points at the viewpoint, or pose of the user or the HMD.

In particular embodiments, a computing system may generate an initial output image of a viewpoint of a scene of an artificial reality environment for display to a user that may include for example, one or more two-dimensional occlusion surfaces and one or more virtual objects. As an example and not by way of limitation, this initial output image of a view may be a view of an artificial reality environment including a set of virtual objects, for example a virtual bear, and one or more two-dimensional occlusion surfaces that represent real objects within the real environment. The computing system may utilize a ray-casting or other rendering process, such as ray tracing, for determining visibility of the one or more virtual objects relative to the one or more physical objects by comparing a model or surface representing the virtual object with the one or more two-dimensional occlusion surfaces within a view of an artificial reality environment.

In particular embodiments, the first computing system (e.g., a laptop, a cellphone, a desktop, a wearable device) may perform this first ray-casting process to render a viewpoint of a scene of an artificial reality environment. A "viewpoint" of an artificial reality environment may refer to a user perspective of the artificial reality environment, which may, for example, be determined based on a current position and orientation of an HMD. This use of the ray-casting process may be referred to herein as a "visibility test," because it may be used to determine a visibility of a virtual object 510 relative to the one or more physical objects by comparing a model of the virtual object with the one or more two-dimensional occlusion surfaces. For example, the predetermined depths of the one or more two-dimensional occlusion surfaces permits the computing system to determine and render the proper occlusion of the virtual objects relative to the one or more physical objects in the real environment, for example by occluding a portion of the surface representing a virtual object in the scene based on the pose of the one or more two-dimensional occlusion surfaces in the three-dimensional coordinate system. The ray-casting process may ultimately be used to associate pixels of the screen with points of intersection on any objects that would be visible for a view of an artificial reality environment.

In particular embodiments, the generated views may be rendered by one or more components (e.g., CPU, GPU, etc.) of the computing system physically connected to the HMD. However, the HMD may have limited system resources and a limited power supply, and these limitations may not be appreciably reduced without resulting in too much weight, size, and/or heat for the user's comfort. As a result, it may not be feasible for the HMD to unilaterally handle all the processing tasks involved in rendering a view. In particular embodiments, the one or more components may be associated with a device (e.g., a laptop, a cellphone, a desktop, a wearable device) that may be used to render the initial view (e.g., perform the ray-casting process). In particular embodiments, the device is in communication with a computing system on the HMD but may be otherwise physically separated from the HMD. As an example and not by way of limitation, this device may be a laptop device that is wired to the HMD or communicates wirelessly with the HMD. As another example and not by way of limitation, the device may be a wearable (e.g., a device strapped to a wrist), handheld device (e.g., a phone), or some other suitable device (e.g., a laptop, a tablet, a desktop) that is wired to the HMD or communicates wirelessly with the HMD. In particular embodiments the device may send this initial view to the HMD for display.

In particular embodiments the components of the device that generated the initial view may also generate the one or more two-dimensional occlusion surfaces representing the physical objects in the artificial reality environment. As another example and not by way of limitation, an onboard computing system of an HMD may generate the one or more two-dimensional occlusion surfaces after it receives the initial view from a separate computing system (e.g., from a CPU or GPU of a wearable, handheld, or laptop device). In particular embodiments, there may be a predefined maximum number of surfaces that may be generated for a view (e.g., 16 surfaces) for efficiency purposes. Although this disclosure focuses on displaying a view to a user on an AR HMD, it contemplates displaying the scene to a user on a VR display or any other suitable device.

After posing the two-dimensional occlusion surfaces and generating the initial view of the artificial reality environment, the computing system may need to make one or more adjustments to the view to accurately display the current pose of the one or more two-dimensional occlusion surfaces to the user. The need for these adjustments is unique to displaying artificial reality through, for example, an AR HMD 110 that permits the user to simultaneously see-through and perceive the real environment around them. For example, because the user is experiencing the artificial reality environment in real-time, after performing the processes described herein to render the image of the artificial reality environment for display, the computing system may be roughly 100 milliseconds behind the current pose of the user's head (e.g., the HMD pose), resulting in a slightly different perspective that the initially rendered view. Thus, if there is significant latency in updating the view to reflect this change in perspective with an artificial reality environment that allows the user to perceive the real environment around them, the user may be able to perceive the latency, creating a sensory dissonance. To prevent this dissonance, what is displayed to the user may need to account for changes in user perspective at a very rapid rate. However, re-rendering the entire artificial reality environment to account for these changes in perspective takes time. As an example and not by way of limitation, even with a powerful computing system frames may only be rendered in this way at 60 Hz, which means that any changes in perspective that occur within 1/60th of a second (e.g., from a rapid head movement) would not be captured by what is rendered and displayed. Further, re-rendering the entire view is a resource-intensive task that may involve performing a large number of "visibility tests." to obtain visual information (e.g., color and transparency information) to render the view.

To remedy any changes in perspective that may result from the movement of the user's head during this latency period, rather than re-render the entire view the computing system may adjust the pose of the one or more two-dimensional occlusion surfaces for a particular view to efficiently deal with rendering views quickly. The adjustments may account for a change in a user's perspective of the artificial reality environment during the time the view is rendered (e.g., resulting from a HMD on a user's head moving to a different position and/or orientation).

In particular embodiments, one such shortcut for approximating changes to a view may involve resampling the two-dimensional occlusion surfaces within a view (rather than re-rendering the entire view). In particular embodiments, resampling may involve performing a second ray-casting process to determine an approximation of how two-dimensional occlusion surfaces may look from an adjusted perspective that may result from one or more movements of the user's head (and the HMD and cameras) during this latency period. The adjusted perspective may be based on the latest viewpoint, position, and orientation information from the HMD, which may be continuously or semi-continuously received by the computing system (e.g., using inertial, optical, depth, and/or other sensors on the HMD or on a remote device tracking the HMD) to determine the perspective of the user wearing the HMD at any given time. In particular embodiments, the computing system may also continuously or semi-continuously track the eye position of the user (e.g., to adjust for distortions resulting from lenses of the HMD that may be dependent on the user's gaze). In particular embodiments the latest viewpoint may be further determined based on the user's gaze (e.g., as determined by eye tracking).

By focusing on just resampling a limited number of surfaces within a view (e.g., 16 surfaces), the view can be modified quickly—and sufficiently quickly to prevent or reduce user perception of latency. As an example and not by way of limitation, further second ray-casting processes may be performed every 1/200th of a second, to account for possible changes in perspective from a change in position or orientation of the HMD. In particular embodiments, an onboard computing system of an HMD may resample one or more of the surfaces by performing a ray-casting process to reflect the latest perspective of the user. If the perspective has changed since the previous ray-casting process, the imaginary rays may accordingly intersect with different points of the surface. Modifying the view based on resampling in this manner may only be an approximation of how the view is supposed to be altered by a change in perspective, and this approximation may only work for relatively small changes in perspective. But this may be all that is needed, because the purpose is to account for changes that happen in relatively short periods of time between when fully rendered frames are generated (e.g., on the order of a hundredth of a second). Essentially, it may be a temporary fix until a view can be re-rendered (e.g., by a more powerful computing system such as a wearable device). As an example and not by way of limitation, a more powerful computing system that may be separate from the HMD (e.g., a wearable device secured to the user's belt or waistline) may re-render the view from scratch every 1/60th of a second and may send these re-rendered views to the HMD device as they are rendered. In this example, the HMD device, in the time between receiving re-rendered views every 1/60th of a second, may on its own modify surfaces (e.g., every 1/200th of a second) to account for rapid changes in user perspective.

In particular embodiments, the ray-casting process may be performed separately for each eye of a user to account for slight changes in the viewpoint (e.g., based on the relative positions of the eyes). As an example and not by way of limitation, the first and second ray-casting processes may be performed for a screen associated with the left eye and for a screen associated with the right eye. These processes may run independently of each other and may even function out of sync with one another.

Figure 5:
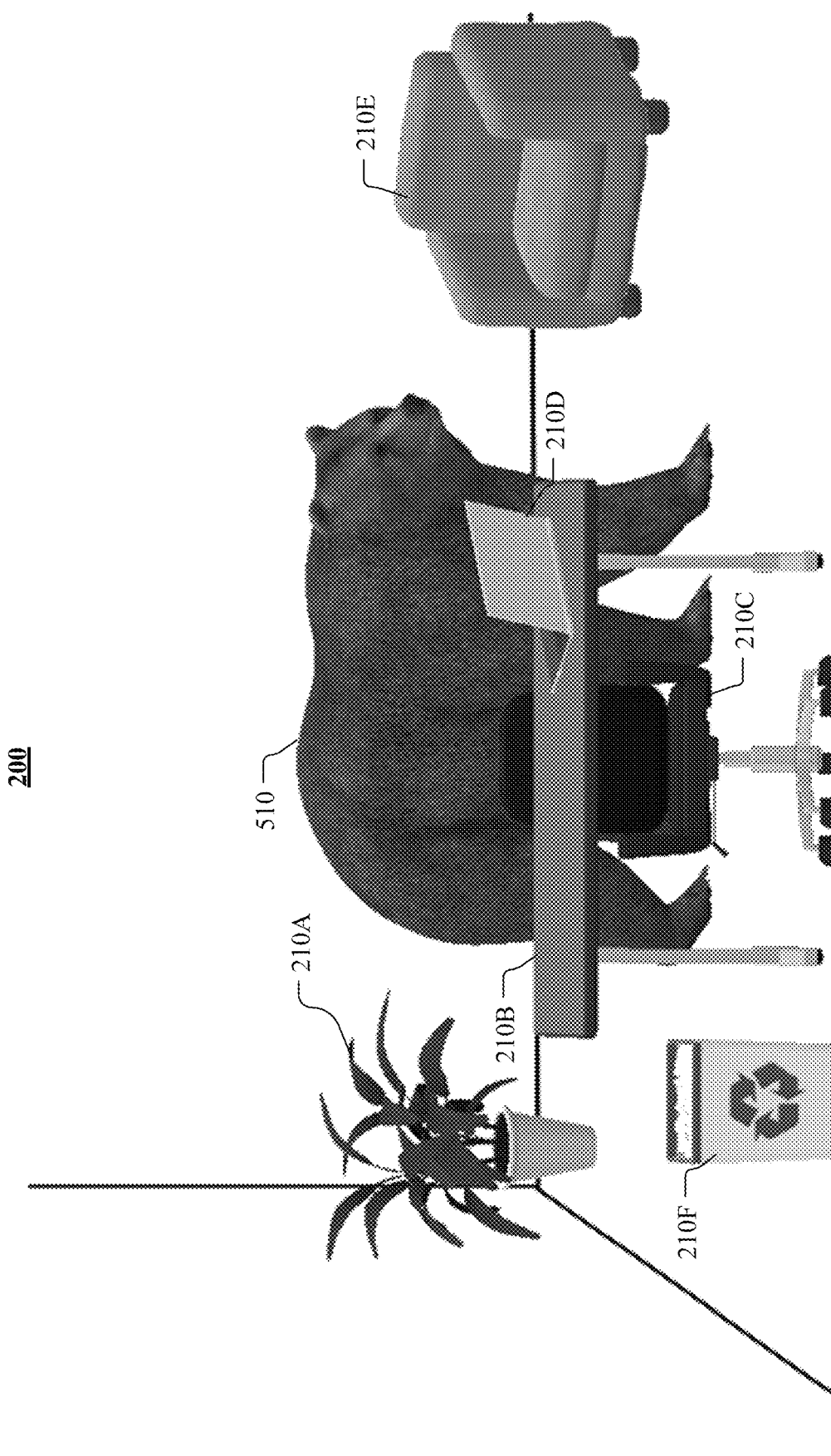
FIG. 5 illustrates an output image of a view of an artificial reality environment that includes one or more two-dimensional occlusion surfaces and one or more virtual objects.

FIG. 5 illustrates an output image of a view of an artificial reality environment that includes one or more two-dimensional occlusion surfaces and one or more virtual objects (e.g., virtual bear 510). The time-adjusted resampled pose of the two-dimensional occlusion surface may be transmitted to the HMD for display. The computing system may generate an output image based on the determined visibility of the virtual object. Generating the output image may be done on the GPU of the computing system by rendering a surface as viewed from user's current viewing position for display. Based on this information, the computing system may display the view accordingly on the HMD based on the relative occlusions determined based on the latest user head pose, and transparencies of the two-dimensional occlusion surfaces and/or virtual objects in the rendered view. The two-dimensional occlusion surfaces (which may be alpha masks) may be used to mask virtual objects that should be occluded by the physical objects in the real environment. For example, if portions of the two-dimensional occlusion surface 410 that are opaque are located ahead of a portion of a virtual object 510 in the environment, the portion of virtual object 510 will not be displayed, as illustrated in FIG. 5. An immersive artificial reality environment may then be displayed accordingly to the user.

While the two-dimensional occlusion surfaces described herein may be well-suited for certain artificial reality applications, it may be advantageous in some artificial reality applications to employ a hybrid approach that combines two-dimensional occlusion surfaces with pre-occluded surfaces representing virtual objects to generate a viewpoint of a scene of an artificial reality environment. For example, because of their vicinity to the user, the user's perspective of nearby physical objects and nearby virtual objects may drastically change even with minor movements or changes in the viewpoint or user pose. As a result, utilizing two-dimensional occlusion surfaces for nearby physical objects or virtual objects may result in visual artifacts or inaccuracies when rendering objects that are close to the user. The use of pre-occluded surfaces for nearby objects, although potentially more resource-intensive than the use of two-dimensional occlusion surfaces, may provide for a more aesthetically pleasing and immersive artificial reality experience for the user. Particular embodiments employ a hybrid approach where the computing system generates and displays pre-occluded surfaces for virtual objects located near the user, and generates two-dimensional occlusion surfaces for physical objects that are located at greater than a minimum distance from the viewpoint or pose of the user. Both techniques can be used, either separately or in combination, for generating a viewpoint of a scene of an artificial reality environment.

In particular embodiments this hybrid approach may be employed based on the depth of one or more physical objects in the real environment from the viewpoint or pose of the user. The computing system may identify one or more physical objects or virtual objects in the real environment that are located within a particular predefined depth range, or are located within a minimum predefined distance from the current pose or viewpoint of the user (e.g., within 1 meter from the user). Using the 3D mesh of the real environment, the computing system may determine the depth of each physical object within the minimum predefined distance, or the depth of each pixel within a view frustrum. The computing system may compare each of these depths with the depth of the posed virtual object to determine which physical objects or pixels are in front of the virtual object and which ones are behind it. This allows the computing system to determine the visibility of the virtual object from the current viewpoint of a user. Based on the visibility determination, the computing system can subsequently render a pre-occluded two-dimensional surface that represents the virtual object as viewed from the particular viewpoint of the user. The rendered pre-occluded two-dimensional surface of the virtual object can be utilized like any other surface in this disclosure (e.g., posed in the three-dimensional coordinate system, adjusted based on movement of the user, used for visibility tests, etc.). For example, the computing system may use one or more pre-occluded two-dimensional surfaces to represent any physical objects or virtual objects located within a certain distance from the pose of the user or within a certain depth region (e.g., returning to FIG. 3B, within depth region 310 (between 0-1 meters from the user)), and use two-dimensional occlusion surfaces to represent any physical objects located outside this distance (e.g., within depth regions 320 and 330 (e.g., greater than 1 meter from the user).

Figure 6:
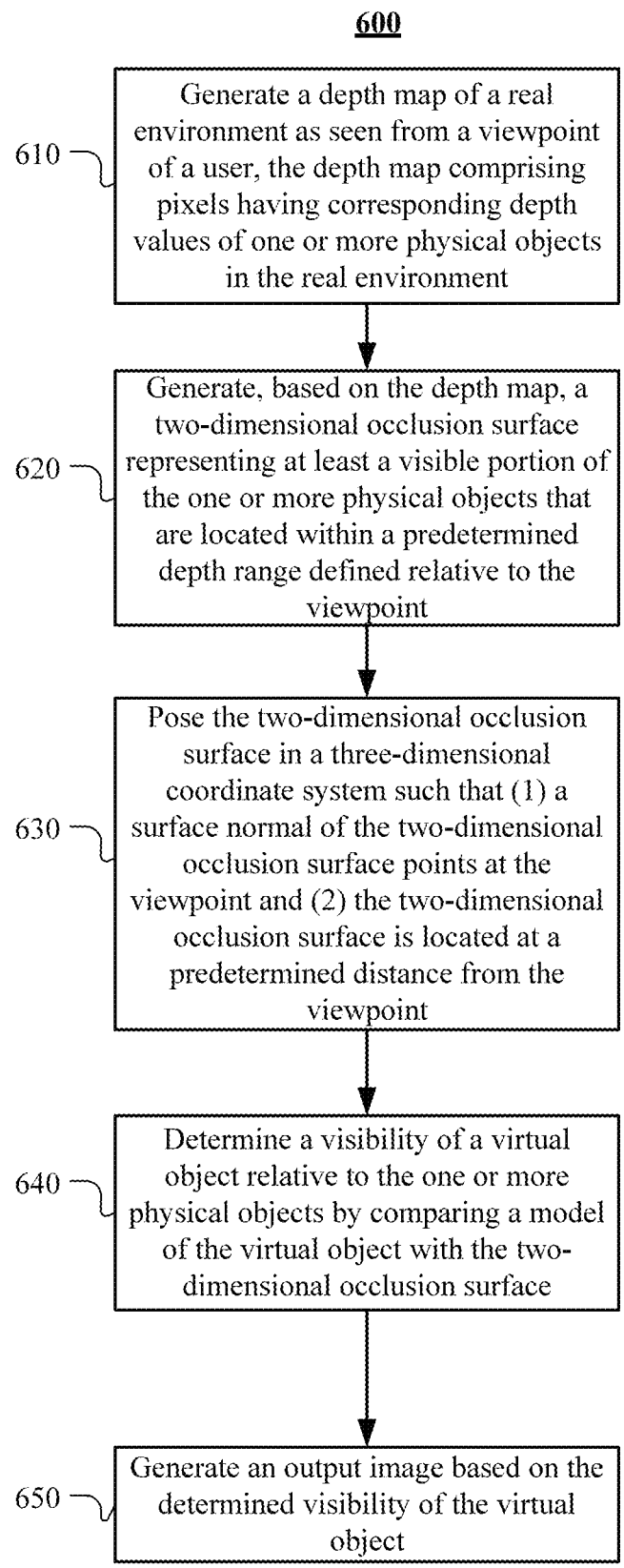
FIG. 6 illustrates an example method for generating an output image based on the determined visibility of a virtual object.

FIG. 6 illustrates an example method 600 for generating an output image based on the determined visibility of a virtual object. The method may begin at step 610, where a computing system may generate a depth map of a real environment as seen from a viewpoint of a user, the depth map comprising pixels having corresponding depth values of one or more physical objects in the real environment.

At step 620, the computing system may generate, based on the depth map, a two-dimensional occlusion surface representing at least a visible portion of the one or more physical objects that are located within a predetermined depth range defined relative to the viewpoint.

At step 630, the computing system may pose the two-dimensional occlusion surface in a three-dimensional coordinate system such that the two-dimensional occlusion surface is located at a predetermined distance from the viewpoint.

At step 640, the computing system may determine a visibility of a virtual object relative to the one or more physical objects by comparing a model of the virtual object with the two-dimensional occlusion surface.

At step 650, the computing system may generate an output image based on the determined visibility of the virtual object.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating an output image based on the determined visibility of a virtual object, including the particular steps of the method of FIG. 6, this disclosure contemplates any suitable method for generating an output image based on the determined visibility of a virtual object including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
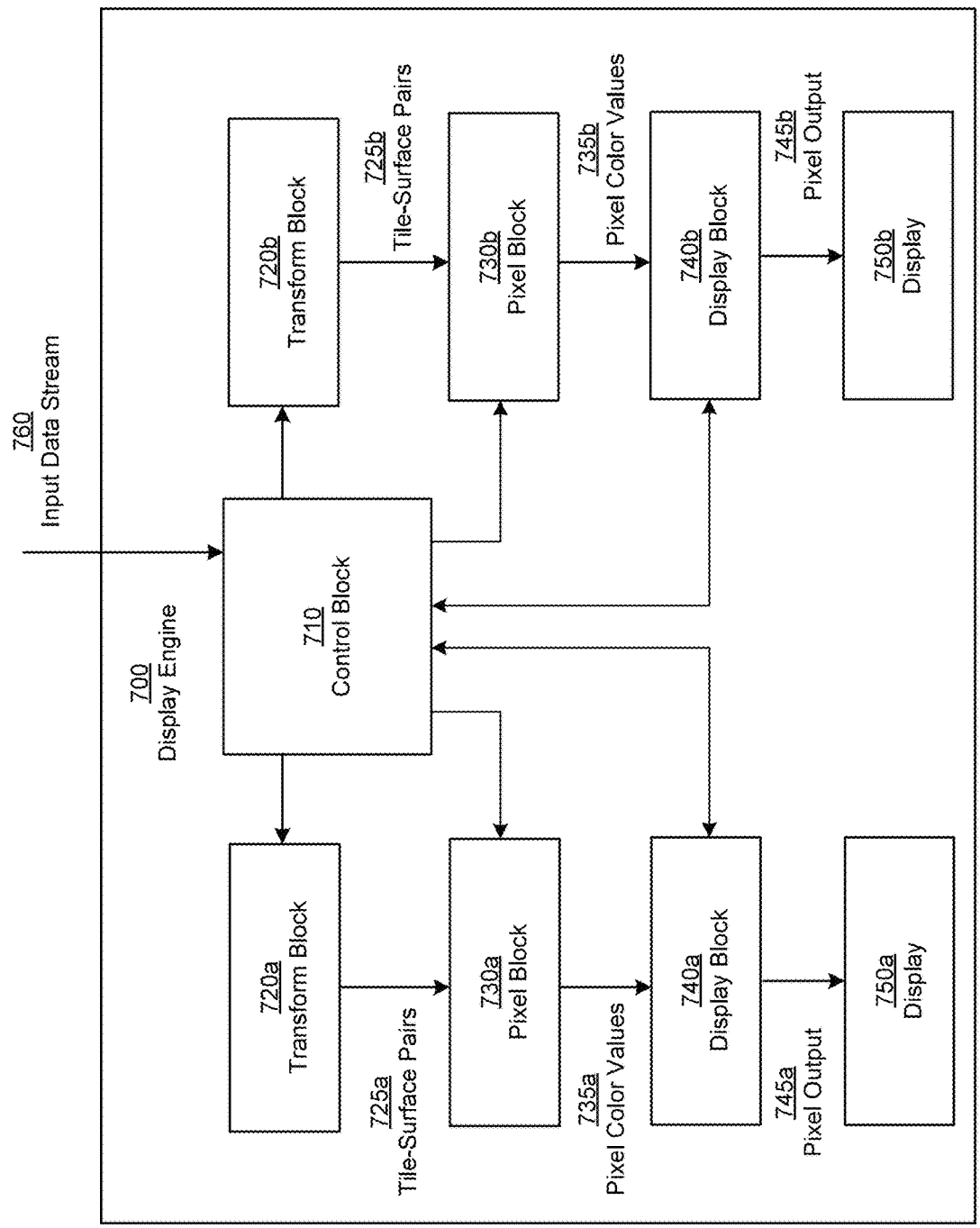
FIG. 7 illustrates a system diagram for a display engine.

FIG. 7 illustrates a system diagram for a display engine 700. The display engine 700 may comprise four types of top level blocks. As shown in FIG. 7, these blocks may include a control block 710, transform blocks 720a and 720b, pixel blocks 730a and 730b, and display blocks 740a and 740b. One or more of the components of the display engine 700 may be configured to communicate via one or more high-speed bus, shared memory, or any other suitable method. As shown in FIG. 7, the control block 710 of display engine 700 may be configured to communicate with the transform blocks 720a and 720b and pixel blocks 730a and 730b. Di splay blocks 740a and 740b may be configured to communicate with the control block 710. As explained in further detail herein, this communication may include data as well as control signals, interrupts and other instructions.

In particular embodiments, the control block 710 may receive an input data stream 760 from a primary rendering component and initialize a pipeline in the display engine 700 to finalize the rendering for display. In particular embodiments, the input data stream 760 may comprise data and control packets from the primary rendering component. The data and control packets may include information such as one or more surfaces comprising texture data and position data and additional rendering instructions. The control block 710 may distribute data as needed to one or more other blocks of the display engine 700. The control block 710 may initiate pipeline processing for one or more frames to be displayed. In particular embodiments, a HMD may comprise multiple display engines 700 and each may comprise its own control block 710.

In particular embodiments, transform blocks 720a and 720b may determine initial visibility information for surfaces to be displayed in the view of the artificial reality environment. In general, transform blocks (e.g., the transform blocks 720a and 720b) may cast rays from pixel locations on the screen and produce filter commands (e.g., filtering based on bilinear or other types of interpolation techniques) to send to pixel blocks 730a and 730b. Transform blocks 720a and 720b may perform ray casting from the current viewpoint of the user (e.g., determined using inertial measurement units, eye trackers, and/or any suitable tracking/localization algorithms, such as simultaneous localization and mapping (SLAM)) into the artificial scene where surfaces are positioned and may produce results to send to the respective pixel blocks (730a and 730b).

In general, transform blocks 720a and 720b may each comprise a four-stage pipeline, in accordance with particular embodiments. The stages of a transform block may proceed as follows. A ray caster may issue ray bundles corresponding to arrays of one or more aligned pixels, referred to as tiles (e.g., each tile may include 16×16 aligned pixels). The ray bundles may be warped, before entering the artificial reality environment, according to one or more distortion meshes. The distortion meshes may be configured to correct geometric distortion effects stemming from, at least, the displays 750a and 750b of the HMD. Transform blocks 720a and 720b may determine whether each ray bundle intersects with surfaces in the artificial reality environment by comparing a bounding box of each tile to bounding boxes for each surface. If a ray bundle does not intersect with an object, it may be discarded. Tile-surface intersections are detected, and corresponding tile-surface pair 725a and 725b are passed to pixel blocks 730a and 730b.

In general, pixel blocks 730a and 730b determine color values from the tile-surface pairs 725a and 725b to produce pixel color values, in accordance with particular embodiments. The color values for each pixel are sampled from the texture data of surfaces received and stored by the control block 710 (e.g., as part of input data stream 760). Pixel blocks 730a and 730b receive tile-surface pairs 725a and 725b from transform blocks 720a and 720b, respectively, and schedule bilinear filtering. For each tile-surface pair 725a and 725b, pixel blocks 730a and 730b may sample color information for the pixels within the tile using color values corresponding to where the projected tile intersects the surface. In particular embodiments, pixel blocks 730a and 730b may process the red, green, and blue color components separately for each pixel. Pixel blocks 730a and 730b may then output pixel color values 735a and 735b, respectively, to display blocks 740a and 740b.

In general, display blocks 740a and 740b may receive pixel color values 735a and 735b from pixel blocks 730a and 730b, converts the format of the data to be more suitable for the scanline output of the display, apply one or more brightness corrections to the pixel color values 735a and 735b, and prepare the pixel color values 735a and 735b for output to the displays 750a and 750b. Display blocks 740a and 740b may convert tile-order pixel color values 735a and 735b generated by pixel blocks 730a and 730b into scanline- or row-order data, which may be required by the displays 750a and 750b. The brightness corrections may include any required brightness correction, gamma mapping, and dithering. Display blocks 740a and 740b may provide pixel output 745a and 745b, such as the corrected pixel color values, directly to displays 750a and 750b or may provide the pixel output 745a and 745b to a block external to the display engine 700 in a variety of formats. For example, the HMD may comprise additional hardware or software to further customize backend color processing, to support a wider interface to the display, or to optimize display speed or fidelity.

Figure 8:
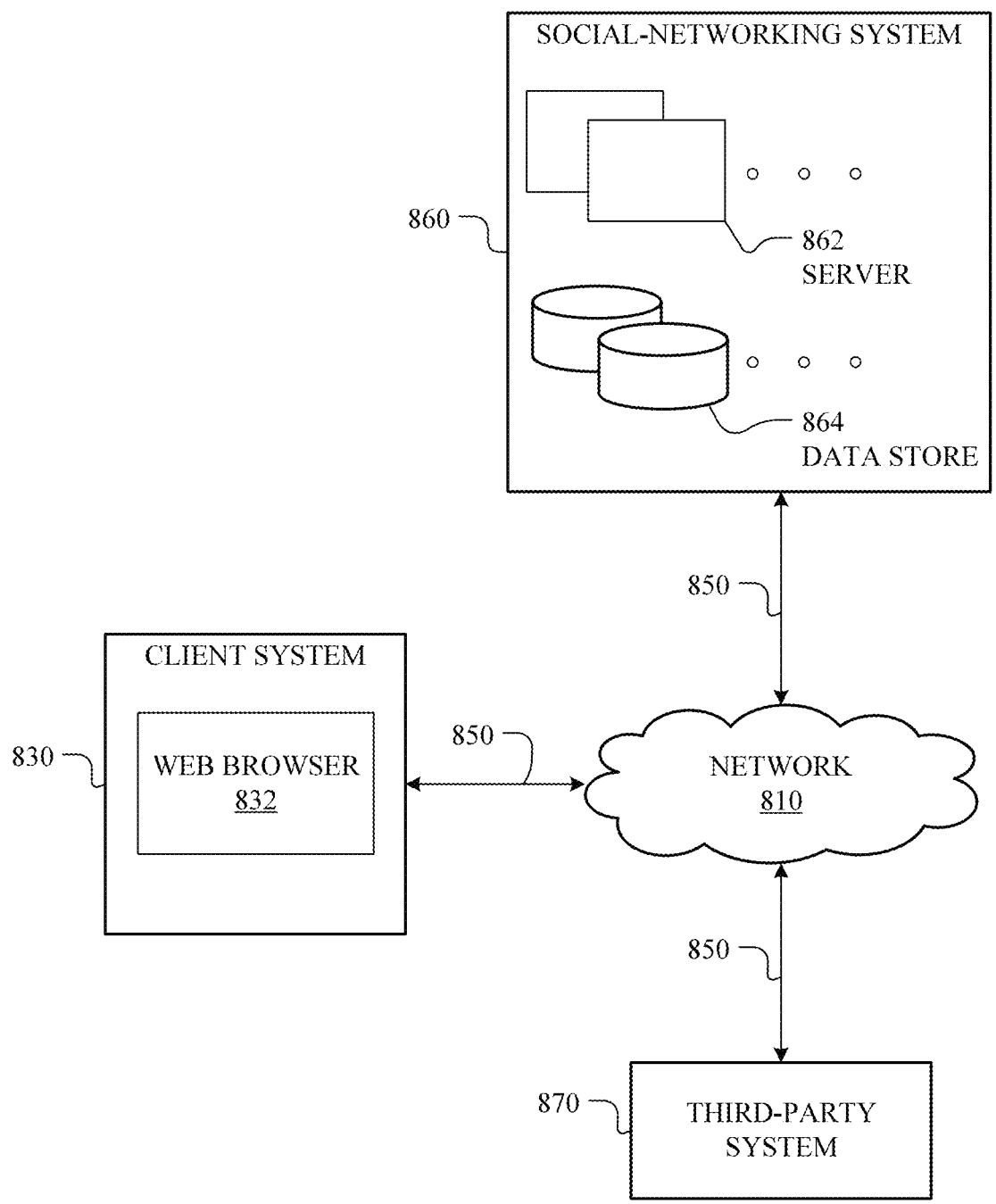
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, and may have one or more add-ons, plug-ins, or other extensions. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
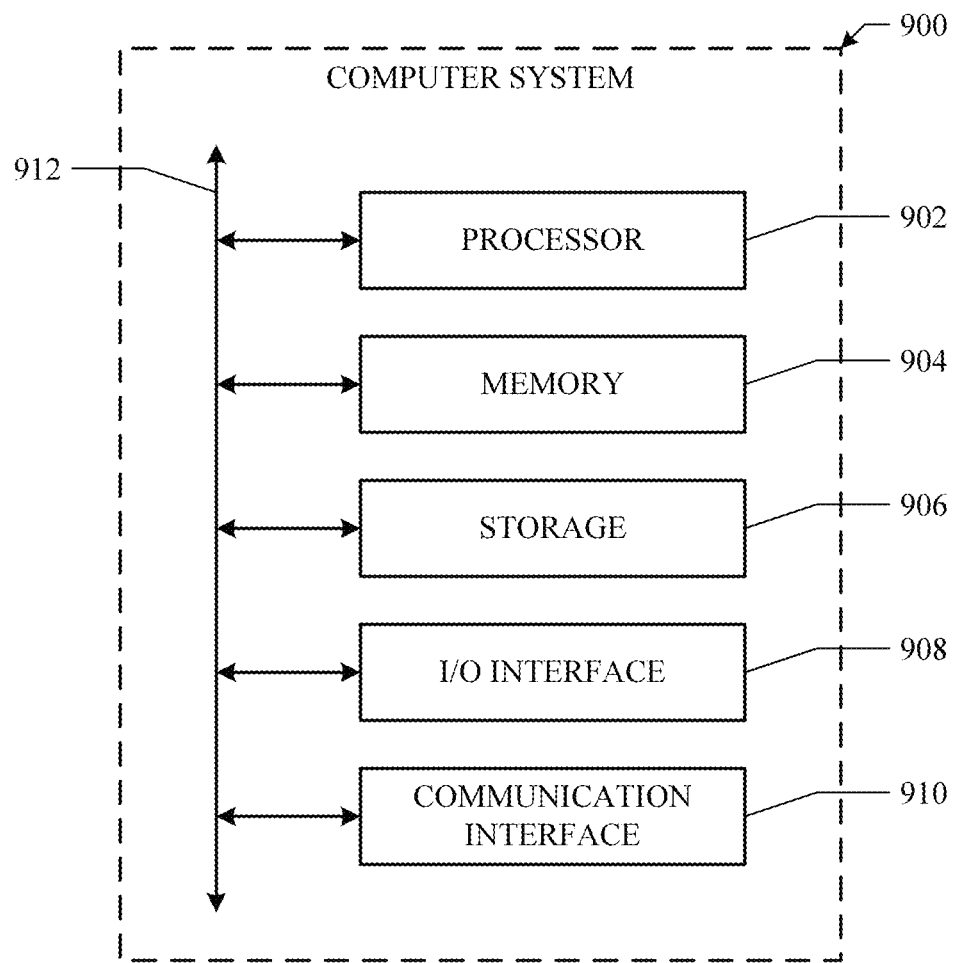
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
generating a depth map of a real environment as seen from a viewpoint of a user, the depth map comprising pixels having corresponding depth values of one or more physical objects in the real environment;
generating, based on the depth map, a first two-dimensional occlusion mask representing at least a visible portion of the one or more physical objects that are located within a first predetermined depth range defined relative to the viewpoint;
generating, based on the depth map, a second two-dimensional occlusion mask representing at least a visible portion of the one or more physical objects that are located within a second predetermined depth range defined relative to the viewpoint, wherein a minimum depth of the second predetermined depth range is greater than a maximum depth of the first predetermined depth range;
posing the first and second two-dimensional occlusion masks in a three-dimensional coordinate system;
determining a visibility of a virtual object relative to the one or more physical objects by comparing a model of the virtual object with the first and second two-dimensional occlusion masks; and
generating an output image based on the determined visibility of the virtual object.

2. The method of claim 1, wherein the first and second two-dimensional occlusion masks are posed such that the first and second two-dimensional occlusion masks are located at a first and second predetermined distance from the viewpoint, respectively.

3. The method of claim 1, further comprising:
generating, based on the based on the depth map, a third two-dimensional occlusion mask representing at least a visible portion of the one or more physical objects that are located within a third predetermined depth range relative to the viewpoint, wherein a minimum depth of the third predetermined depth range is greater than a maximum depth of the second predetermined depth range; and
posing the third two-dimensional occlusion mask in the three-dimensional coordinate system such that the third two-dimensional occlusion mask is located at a third predetermined distance from the viewpoint.

4. The method of claim 3, wherein the third predetermined depth range defined relative to the viewpoint is between (1) greater than 3 meters, and (2) 4 meters from the viewpoint.

5. The method of claim 1, wherein posing the first and second two-dimensional occlusion masks comprises adjusting a position or orientation of the first and second two-dimensional occlusion masks to account for a change in perspective of the one or more physical objects, the change in perspective resulting from one or more movements of a camera worn by the user subsequent to a time the first and second two-dimensional occlusion masks are generated.

6. The method of claim 5, wherein adjusting the position or orientation of the first and second two-dimensional occlusion masks is performed by one or more components of the computing system that are physically connected to a head-mounted display worn by the user.

7. The method of claim 1, wherein the depth map is calculated based on one or more images received from a camera worn by the user that is connected to a head-mounted display.

8. The method of claim 1, wherein the first and second two-dimensional occlusion masks comprise a plurality of texels, wherein each texel is assigned a value that specifies a level of transparency that is to be accorded to the texel.

9. The method of claim 1, wherein the first predetermined depth range defined relative to the viewpoint is between (1) 1 meter, and (2) 2 meters from the viewpoint.

10. The method of claim 9, wherein the second predetermined depth range defined relative to the viewpoint is between (1) greater than 2 meters, and (2) 3 meters from the viewpoint.

11. The method of claim 1, wherein the first and second predetermined depth ranges are a same width.

12. The method of claim 11, wherein the width of the first and second predetermined depth ranges is based on one or more of:
a size of the real environment;
an application the user of the computing system is interacting with; and
a speed or acceleration of the user when the first two-dimensional occlusion mask is generated.

13. The method of claim 1, wherein the computing system comprises one or more computing devices, wherein one or more of the computing devices comprises a head-mounted display and one or more of the computing devices comprises a separate computing device.

14. The method of claim 13, further comprising allocating the steps of the method between a computing device of the head-mounted display and a separate computing device based on one or more metrics of available computing resources.

15. One or more computer-readable non-transitory storage media embodying software that is operable when executed to:
generate a depth map of a real environment as seen from a viewpoint of a user, the depth map comprising pixels having corresponding depth values of one or more physical objects in the real environment;
generate, based on the depth map, a first two-dimensional occlusion mask representing at least a visible portion of the one or more physical objects that are located within a first predetermined depth range defined relative to the viewpoint;
generate, based on the depth map, a second two-dimensional occlusion mask representing at least a visible portion of the one or more physical objects that are located within a second predetermined depth range defined relative to the viewpoint, wherein a minimum depth of the second predetermined depth range is greater than a maximum depth of the first predetermined depth range;
pose the first and second two-dimensional occlusion masks in a three-dimensional coordinate system;
determine a visibility of a virtual object relative to the one or more physical objects by comparing a model of the virtual object with the first and second two-dimensional occlusion masks; and
generate an output image based on the determined visibility of the virtual object.

16. The media of claim 15, wherein the first and second two-dimensional occlusion masks are posed such that the first and second two-dimensional occlusion masks are located at a first and second predetermined distance from the viewpoint, respectively.

17. The media of claim 15, wherein posing the first and second two-dimensional occlusion masks comprises adjusting a position or orientation of the first and second two-dimensional occlusion masks to account for a change in perspective of the one or more physical objects, the change in perspective resulting from one or more movements of a camera worn by the user subsequent to a time the first and second two-dimensional occlusion masks are generated.

18. A system comprising:
one or more processors; and
one or more computer-readable storage media coupled to one or more of the processors and comprising instructions operable when executed by one or more of the processors to cause the system to:
generate a depth map of a real environment as seen from a viewpoint of a user, the depth map comprising pixels having corresponding depth values of one or more physical objects in the real environment;
generate, based on the depth map, a first two-dimensional occlusion mask representing at least a visible portion of the one or more physical objects that are located within a first predetermined depth range defined relative to the viewpoint;
generate, based on the depth map, a second two-dimensional occlusion mask representing at least a visible portion of the one or more physical objects that are located within a second predetermined depth range defined relative to the viewpoint, wherein a minimum depth of the second predetermined depth range is greater than a maximum depth of the first predetermined depth range;
pose the first and second two-dimensional occlusion masks in a three-dimensional coordinate system;
determine a visibility of a virtual object relative to the one or more physical objects by comparing a model of the virtual object with the first and second two-dimensional occlusion masks; and
generate an output image based on the determined visibility of the virtual object.

19. The system of claim 18, wherein the first and second two-dimensional occlusion masks are posed such that the first and second two-dimensional occlusion masks are located at a first and second predetermined distance from the viewpoint, respectively.

20. The system of claim 18, wherein posing the first and second two-dimensional occlusion masks comprises adjusting a position or orientation of the first and second two-dimensional occlusion masks to account for a change in perspective of the one or more physical objects, the change in perspective resulting from one or more movements of a camera worn by the user subsequent to a time the first and second two-dimensional occlusion masks are generated.

* * * * *